United States Patent

Sakumoto et al.

Patent Number: 6,009,375
Date of Patent: Dec. 28, 1999

[54] PORTABLE GPS RECEIVER

[75] Inventors: Kazumi Sakumoto; Hiroshi Odagiri; Chiaki Nakamura; Keisuke Tsubata, all of Chiba, Japan

[73] Assignee: Seiko Instruments Inc., Japan

[21] Appl. No.: 08/948,758

[22] Filed: Oct. 10, 1997

[51] Int. Cl.⁶ ............................................... G01C 21/00
[52] U.S. Cl. ................................ 701/216; 342/357.14
[58] Field of Search .................................. 701/216, 213; 342/357.14; 702/160

[56] References Cited

U.S. PATENT DOCUMENTS

| | | | |
|---|---|---|---|
| 4,387,437 | 6/1983 | Lowrey et al. | 702/160 |
| 5,312,310 | 5/1994 | Shimizu et al. | 482/54 |
| 5,769,613 | 8/1998 | Kato et al. | 701/214 |

Primary Examiner—Gregory C. Issing
Attorney, Agent, or Firm—Adams & Wilks

[57] ABSTRACT

There is disclosed a portable GPS (Global Positioning System) receiver carried by a user. The receiver measures the distance traveled by the user and the speed. In the prior art technique, if satellites cannot be captured, no measurements are made. To find the distance and speed accurately, the measurements have to be performed continuously, thus increasing the electric power consumed by the receiver. The inventive receiver once finds the speed from the Doppler frequencies of the carrier waves. Then, a first distance-calculating means finds the distance from the speed. A walk-detecting means detects walking. A step number-calculating means accumulates the number of steps taken in steps. A stride-calculating means finds the stride from the accumulated step number and from the found distance. Then, a second distance-calculating means finds the distance from the stride and from the accumulated number of steps. A speed-calculating means finds the speed. The GPS receiver receives at regular intervals and updates the stride.

5 Claims, 15 Drawing Sheets

PORTABLE GPS RECEIVER

FIELD OF THE INVENTION

The present invention relates to a GPS (Global Positioning System) receiver for determining its location and velocity by receiving signals from GPS satellites and, more particularly, to a hand-held GPS, receiver for determining its location, the distance traveled, and the speed of the user when he or she is running or walking.

BACKGROUND OF THE INVENTION

The conventional GPS comprises 24 GPS satellites that are in 6 orbits and circle the earth approximately 12 hours at an altitude of about 20,200 km and at an inclination angle of 55 degrees. A GPS receiver on the earth receives navigational data necessary for position determination from 3 to 4 satellites of these 24 GPS satellites. The receiver then computes the location, the velocity, etc. of a vehicle or moving object carrying the receiver. The receiver can also find the velocity vector of the moving object by measuring the Doppler frequencies of the carrier waves. The GPS satellites use two transmission frequencies: L1 having a frequency of 1.57542 GHz and L2 having a frequency of 1.22760 GHz. L1 is used for normal determination of locations, and is PSK (phase shift keying)-modulated by pseudo-noise codes that are synthesized waves representing navigational data including C/A codes identifying satellites, information about the orbits of the satellites, and time information. The waves are caused to spread into a spectrum and transmitted from the satellites. These waves are received by the GPS receiver shown in FIG. 6. This receiver has an antenna 601 receiving signals of 1.57542 GHz. The signals are amplified by an L-band amplifier circuit 602. The output signal from this amplifier circuit 602 is converted into a first intermediate-frequency (IF) signal in the band of tens of MHz to 200 MHz by a down-converter portion 603 and then into a second IF signal in the band of approximately 2 MHz to 5 MHz. The second IF signal is applied to a voltage comparator 604 and converted into digital form with a clock frequency several times as high as the IF signal. The output from the voltage comparator 604 is diffuse spectral data. A C/A code-generating circuit 606 produces the same C/A codes, or pseudo-noise codes, as the satellites. A message-encoding means 605 inversely diffuses the C/A codes from the C/A code-generating circuit 606 into the digital output signal from the voltage comparator 604. This operation is performed for plural satellites. Normally, a position-calculating means 607 finds position-locating data from the navigational data from four satellites. As GPS receivers are miniaturized in this way, proposals have been made to use them to find the distance traveled or the velocity of the user when he or she runs or walks, as disclosed in Japanese Patent Laid-Open No. 118156/1994.

Where the prior art GPS receiver is used to measure the distance traveled by a human body or its velocity, various problems take place. Where the GPS receiver is installed on a vehicle, if it is in a tunnel, in a building, or in a valley between tall buildings, the measurement is difficult to perform. In such places, the navigational operation can be continued, using self-contained navigation such as map matching. However, in the case of a small-sized GPS receiver such as the hand-held type, it is difficult to incorporate map information in the form of a CD-ROM into the small-sized GPS receiver because of its size. Where the receiver is installed in a vehicle, the distance traveled and the speed can be obtained from instruments installed on the vehicle. In the hand-held-type, the distance traveled and speed themselves are found from GPS satellites and, therefore, if the satellites cannot be captured, no measurements can be performed. Also, in order to accurately find the distance traveled and speed, it is necessary to constantly perform the measuring operation. This increases the amount of electric power consumed by the GPS receiver.

SUMMARY OF THE INVENTION

It is an object of the present invention to provide a portable GPS receiver which permits measurements of the distance traveled and speed even when the satellites cannot be captured.

It is another object of the invention to provide a portable GPS receiver which makes the measurements accurate without continuous reception.

It is a further object of the invention to provide a portable GPS receiver which has a low power consumption with intermittent reception.

DESCRIPTION OF THE PREFERRED EMBODIMENTS

Figure 1:
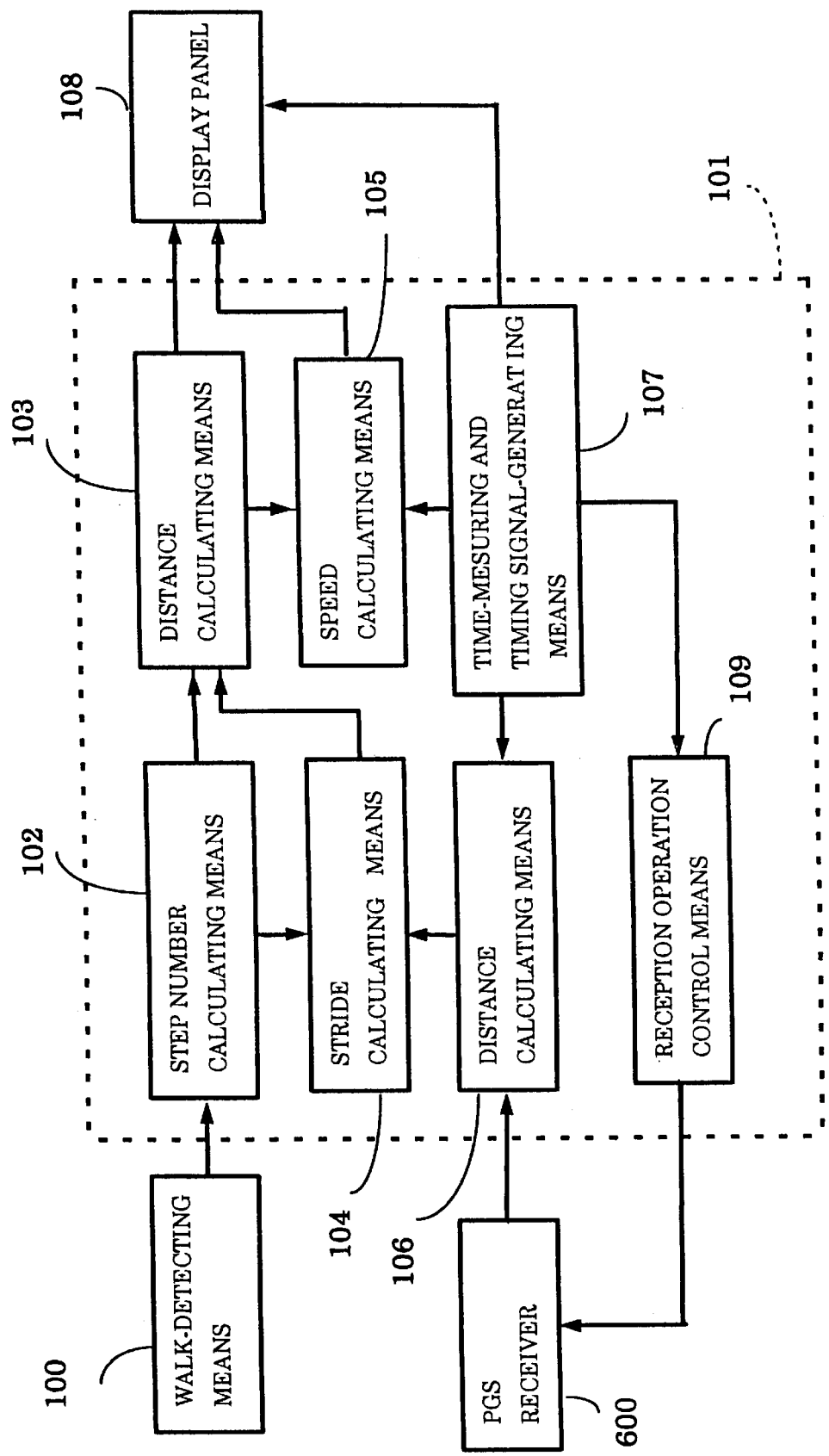
FIG. 1 is a functional block diagram of a portable GPS receiver in accordance with the present invention.

In view of the foregoing problems, the invention has been made. A first embodiment of the invention is comprised of a GPS receiver designed as follows. The speed is once found from the Doppler frequencies of the carrier waves by the GPS receiver. The distance is found from the speed and time by a first distance-calculating means. During measurement of the speed, walking is detected by a walk-detecting means. The number of steps taken in walking is accumulated by a step number-calculating means. A stride-calculating means finds the stride from both accumulated number of steps and distance calculated by the first distance-calculating means. Then, a second distance-calculating means finds the distance traveled from both stride and accumulated step number. A velocity-calculating means finds the speed. The GPS receiver receives at regular intervals and updates the stride.

A second embodiment is comprised of a pitch-calculating means for calculating the pitch, or the number of steps per unit time, from the number of steps accumulated by the step number-calculating means, from the measured time, and from time data from a timing means, along with the structure of the first embodiment. There is further provided a reception operation control means that instructs the GPS receiver to start a reception operation in response to a certain change in the pitch signal. After a lapse of a certain period, the reception operation control means stops the reception operation.

A third embodiment is comprised of a walking magnitude-detecting means and a reception operation control means, along with the structure of the first embodiment. The walking magnitude-detecting means judges the magnitude of the walking. The reception operation control means instructs the GPS receiver to start a reception operation in response to a certain change in the magnitude of the walking. After a lapse of a certain period, the reception operation control means stops the reception operation.

A fourth embodiment is comprised of an illumination change-detecting means and a reception operation control means, along with the structure of the first embodiment. The illumination change-detecting means detects changes in the illuminance around the receiver. The reception operation control means instructs the GPS receiver to start a reception operation in response to a certain change in the illuminance. After a lapse of a certain period, the reception operation control means stops the reception operation.

A fifth embodiment is comprised of a pulse rate-detecting means and a reception operation control means, along with the structure of the first embodiment. The pulse rate-detecting means detects the pulse rate of the user bearing the receiver. When a certain change in the pulse rate occurs, the reception operation control means instructs the GPS receiver to start a reception operation in response to a certain change in the pulse rate. After a lapse of a certain period, the reception operation control means stops the reception operation.

Other objects and features of the invention will appear in the course of the description thereof, which follows.

Referring to FIG. 1, a portable GPS receiver embodying the concept of the present invention is generally indicated by reference numeral 600 and has a time-measuring-and-timing signal-generating means 107 that measures time and creates a reference timing signal. A reception operation control means 109 starts a reception operation of the GPS receiver 600 at regular intervals of time and stops the reception operation after a lapse of a given time. A first distance-calculating means 106 calculates the distance traveled by the GPS receiver from the speed and from time data provided from the time-measuring-and-timing signal-generating means 107. The speed of the receiver is found from the Doppler frequencies of the carrier waves, the Doppler frequencies being measured during the reception operation. A walk-detecting means 100 detects walking of a human body. A step number-calculating means 102 accumulates the output signal from the walk-detecting means 100 and calculates the number of steps taken in walking. A stride-calculating means 104 calculates the stride per step of the user carrying this GPS receiver from the distance calculated by the distance-calculating means 106 and from the step number computed by the step number-calculating means 102 while the data indicating the distance is being produced. A second distance-calculating means 103 calculates the distance walked by user from the stride found by the stride-calculating means 104 and from the step number found by the step number-calculating means 102 until the next reception timing. A stride-calculating means 104 calculates the distance walked from the stride found by the stride-calculating means 104 and from the step number found by the step number-calculating means 102 until the next reception timing. A speed-calculating means 105 calculates the speed from the distance walked found by the distance-calculating means 103 and from time data provided by the time-measuring-and-timing signal-generating means 107.

Figure 2:
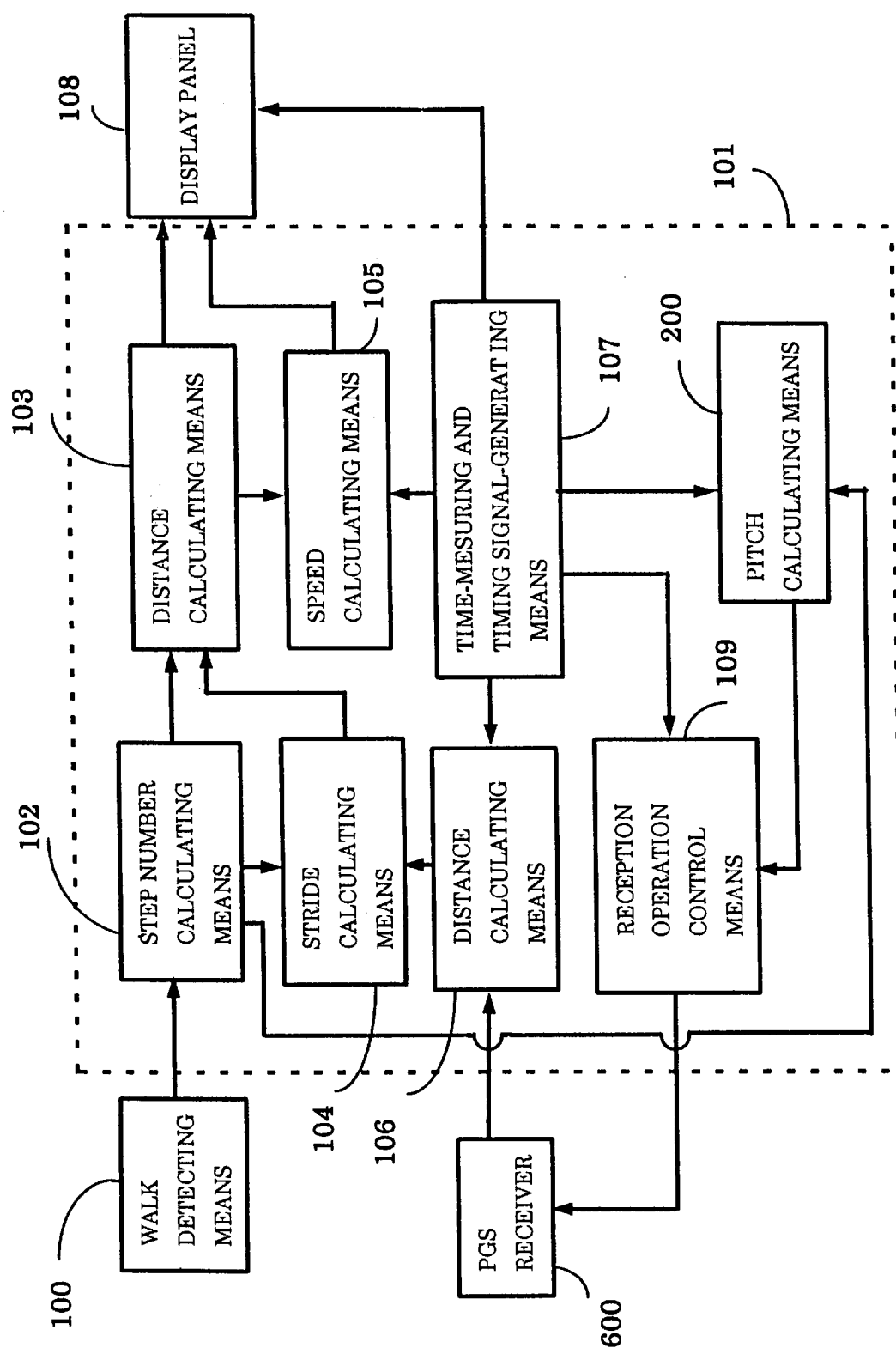
FIG. 2 is a functional block diagram of another portable GPS receiver in accordance with the invention.

Referring next to FIG. 2, there is shown another portable GPS receiver in accordance with the invention. This receiver is similar to the GPS receiver shown in FIG. 1 except that a pitch-calculating means 200 is added. This pitch-calculating means 200 calculates the pitch, or the number of steps taken in walking per unit time, from the number of steps accumulated by the step number-calculating means 102 and from the time data supplied from the time-measuring-and-timing signal-generating means 107. The reception operation control means 109 instructs the GPS receiver 600 to start a reception operation in response to a change in the pitch signal. After a lapse of a given period, the reception operation control means 109 ends the reception operation.

Figure 3:
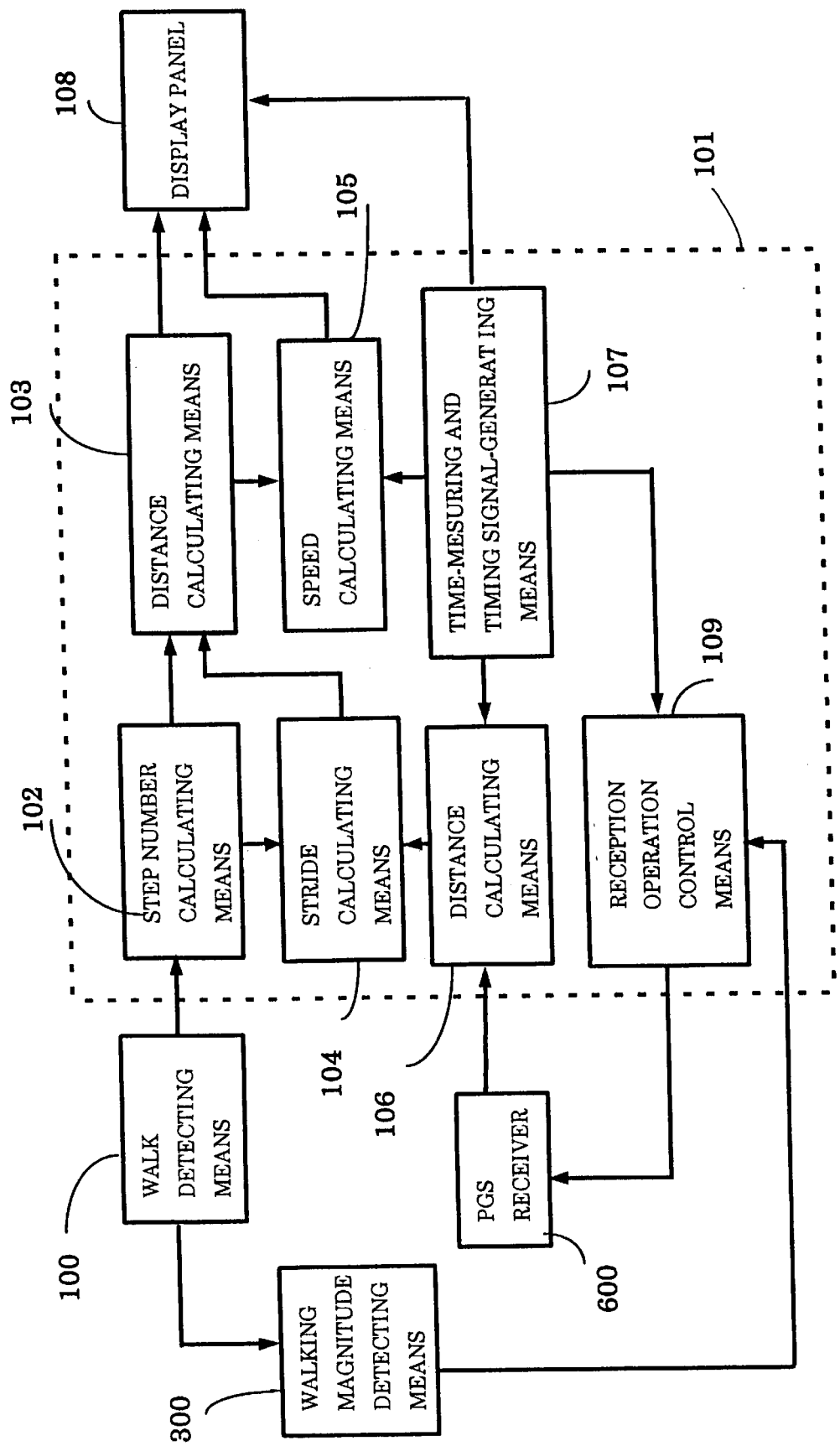
FIG. 3 is a functional block diagram of a further portable GPS receiver in accordance with the invention.

Referring next to FIG. 3, there is shown a further portable GPS receiver in accordance with the invention. This receiver is similar to the GPS receiver shown in FIG. 1 except that a walking magnitude-detecting means 300 is connected after the walk-detecting means 100. This walking magnitude-detecting means 300 judges the magnitude of the walking signal from the walk-detecting means 100. The reception operation control means 109 orders the GPS receiver 600 to start a reception operation in response to a change in the walking magnitude. After a lapse of a given period, the reception operation control means 109 ends the reception operation.

Figure 4:
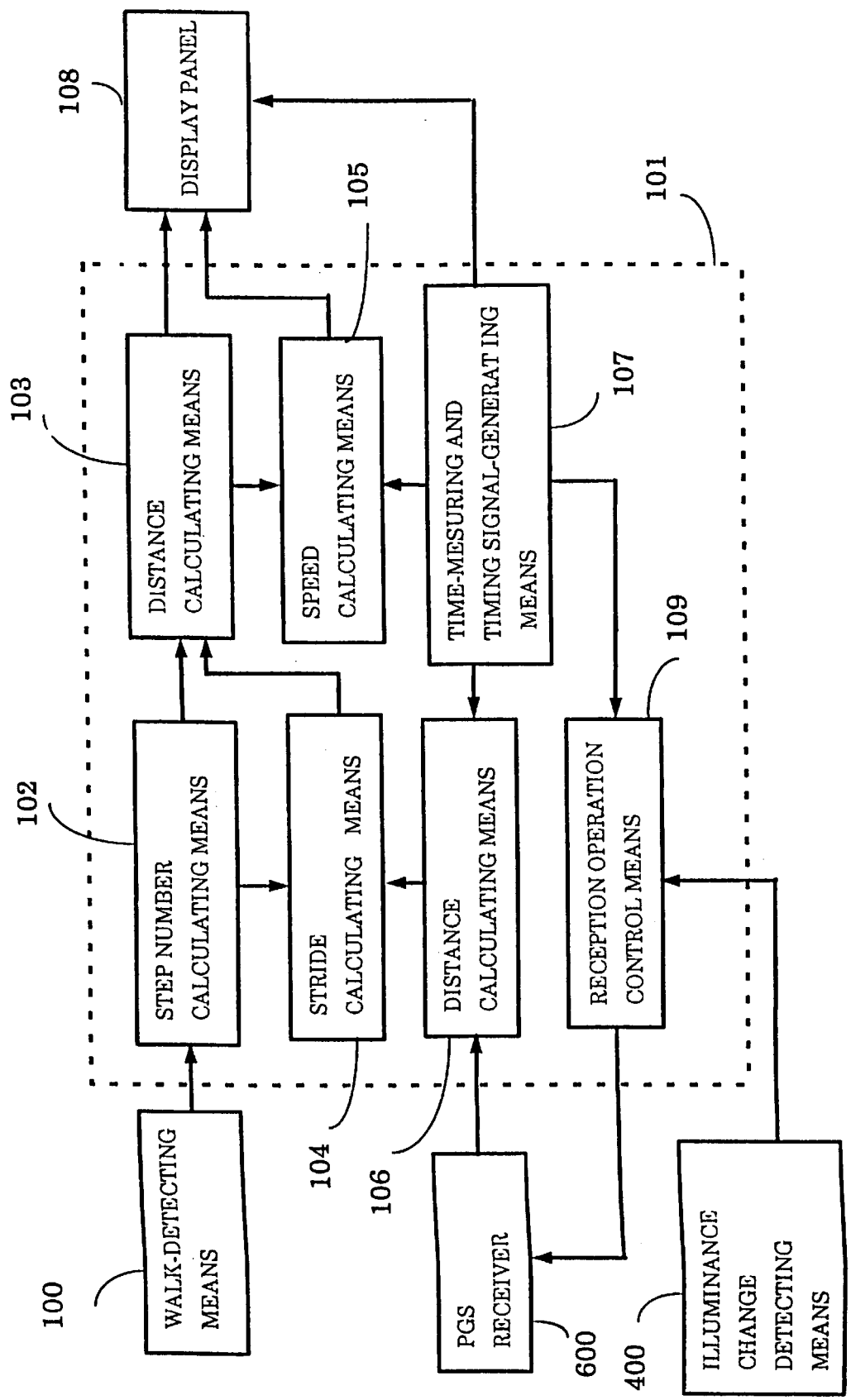
FIG. 4 is a functional block diagram of a still other portable GPS receiver in accordance with the invention.

Referring next to FIG. 4, there is shown a yet other portable GPS receiver in accordance with the invention. This receiver is similar to the GPS receiver shown in FIG. 1 except that an illuminance change-detecting means 400 is connected with the reception operation control means 109. This illuminance change-detecting means 400 detects changes in the illuminance around the receiver. The reception operation control means 109 commands the GPS receiver 600 to start a reception operation in response to a change in the illuminance signal. After a lapse of a given period, the reception operation control means 109 terminates the reception operation.

Figure 5:
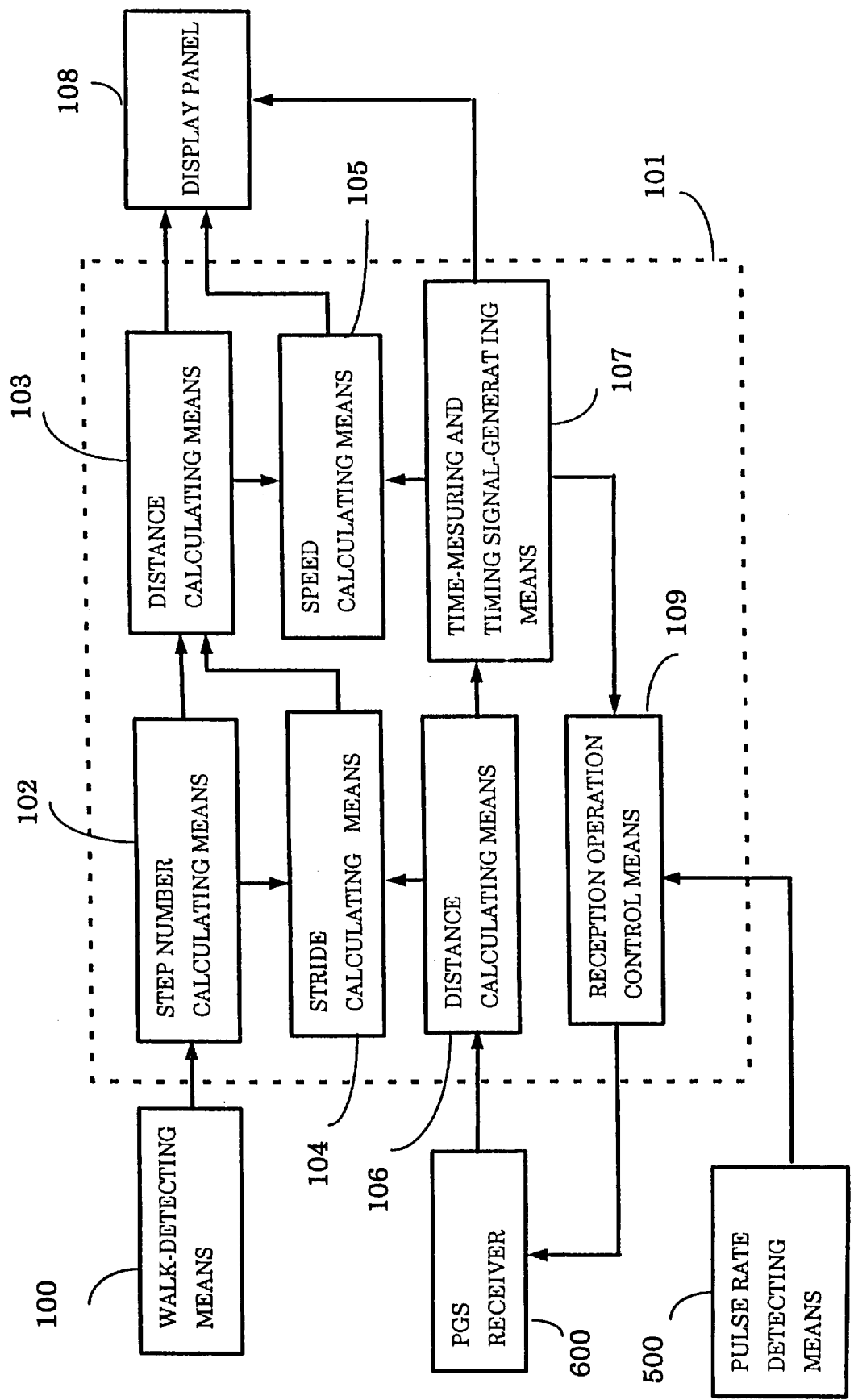
FIG. 5 is a functional block diagram of a yet other portable GPS receiver in accordance with the invention.

Referring next to FIG. 5, there is shown a still other portable GPS receiver in accordance with the invention. This receiver is similar to the GPS receiver shown in FIG. 1 except that a pulse rate-detecting means 500 is connected with the reception operation control means 109. This pulse rate-detecting means 500 detects the pulse rate of the user.

The reception operation control means 109 instructs the GPS receiver 600 to start a reception operation in response to a change in the pulse rate. After a lapse of a given period, the reception operation control means 109 ends the reception operation.

Figure 6:
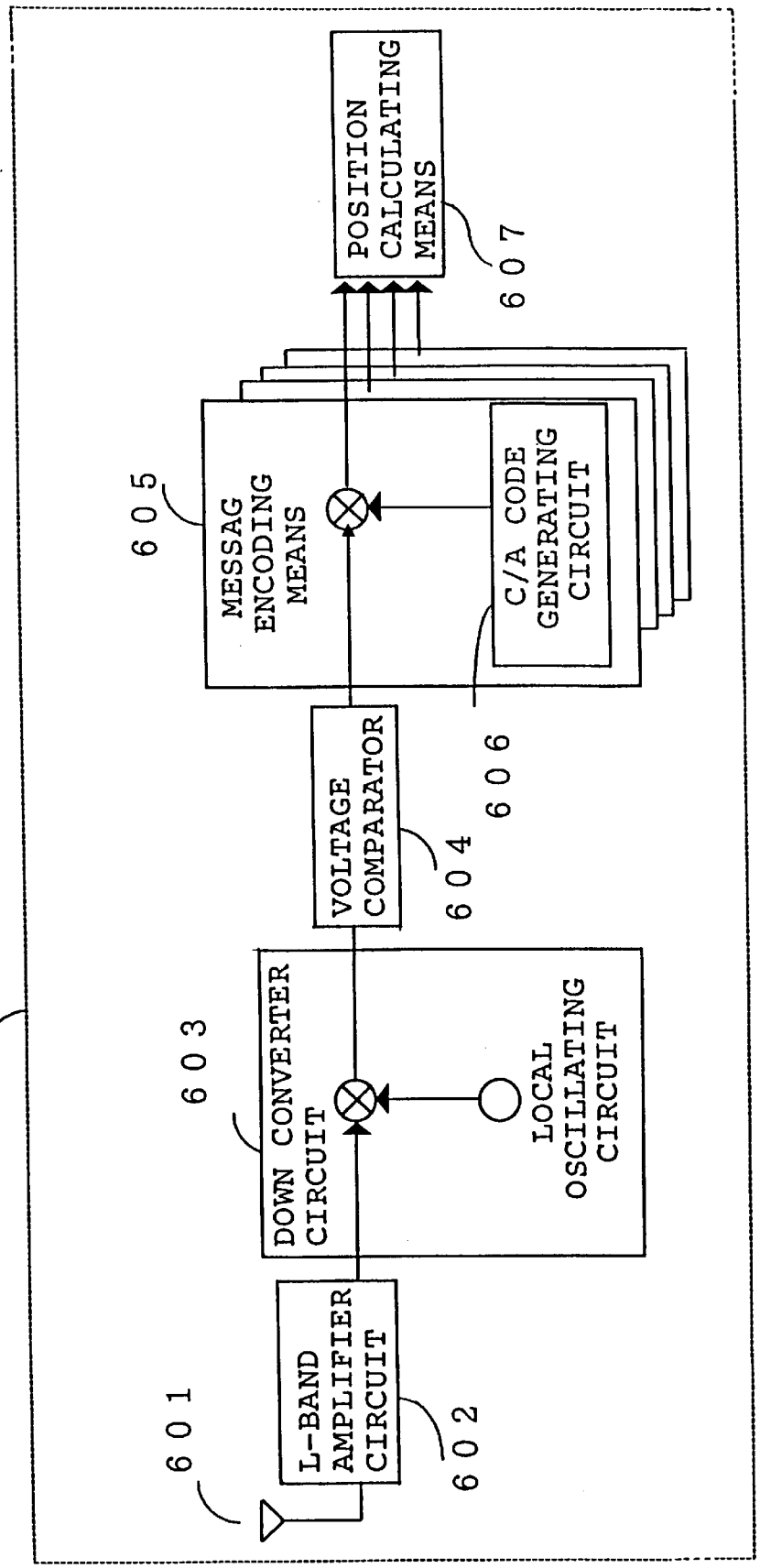
FIG. 6 is a functional block diagram of the prior art GPS receiver.
Figure 7:
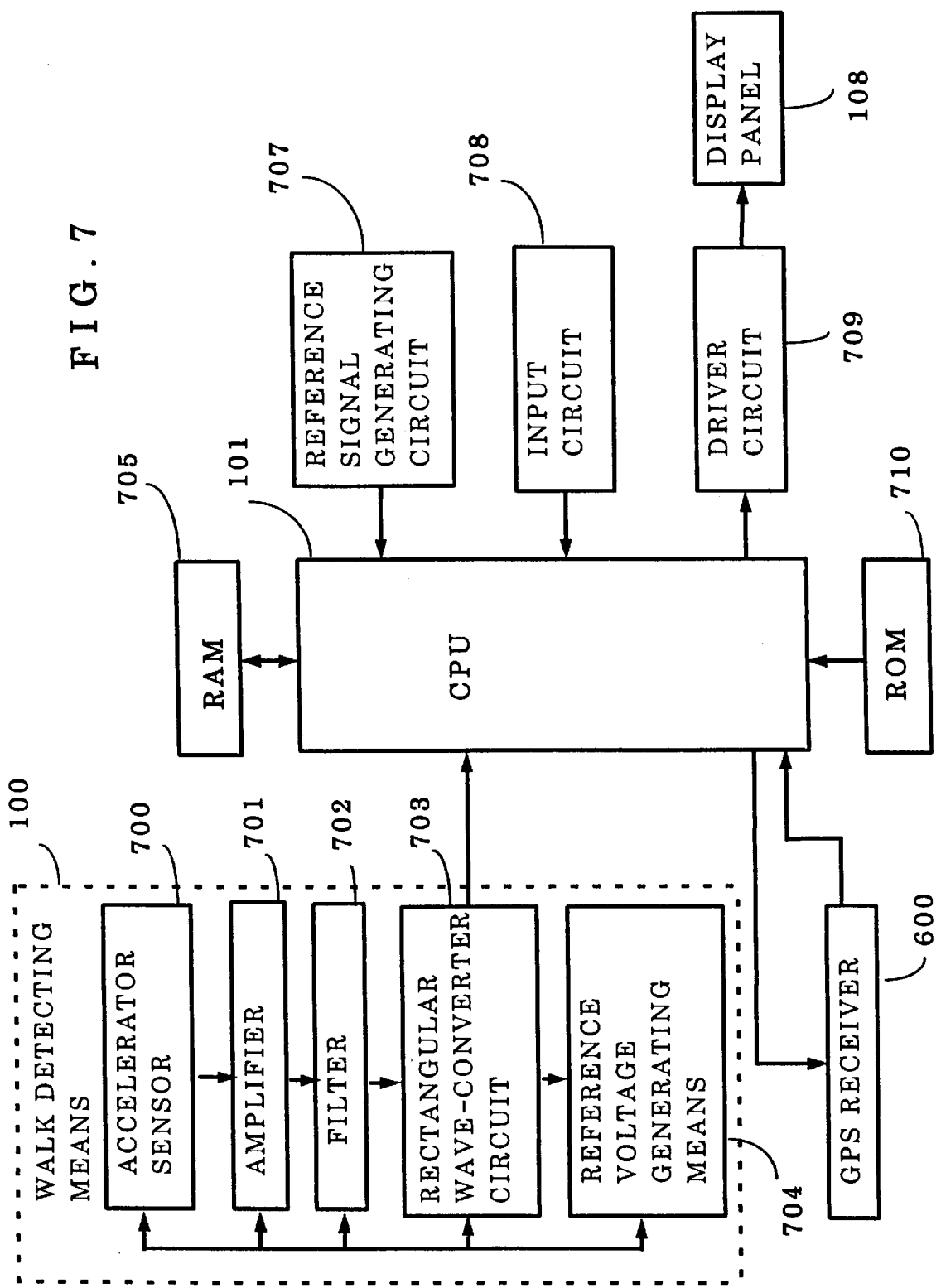
FIG. 7 is a functional block diagram of an additional portable GPS receiver.

Referring to FIG. 7, the functions of a typical construction of the present invention are shown in block diagram form. This GPS receiver has a walk-detecting means 100 including an accelerator sensor 700 using a cantilevered accelerator sensor to which a piezoelectric device is bonded. This accelerator sensor 700 generates vibrating displacements according to walking or running and produces a corresponding electric charge. An amplifier circuit 701 amplifies the output signal from the accelerator sensor 700. A filter 702 filters out noise components such as ac line-frequency components. A rectangular wave-converter circuit 703 converts the output signal from the filter 702 into digital form. A reference voltage-generating circuit 704 applies a reference voltage to the various circuits of the walk-detecting means 100. The rectangular wave-converter circuit 703 produces an output signal synchronized with walking to a CPU 101. A sequence of operations is programmed into a ROM 710. The CPU 101 calculates the number of steps taken in walking, the distance, and so on according to the contents of the ROM 710. A RAM 705 is connected with the CPU 101 and acts as a register that holds data when the CPU 101 is in operation. Reception operation of the GPS receiver 600 is under control of the CPU 101. The receiver 600 has functions from the antenna 601 to the position-calculating means 607 as described in connection with FIG. 6, and sends data about the location and speed to the CPU 101. A reference signal-generating circuit 707 generates a reference signal for the operation of the CPU 101. An input circuit 708 is a switch for commanding start of operation of the instrument, and transmits an input signal to the CPU 101. A driver circuit 709 converts signals indicating the distance, speed, and time found by the CPU 101 into signals so that these distance etc. are displayed on a display panel 108.

Figure 8A:
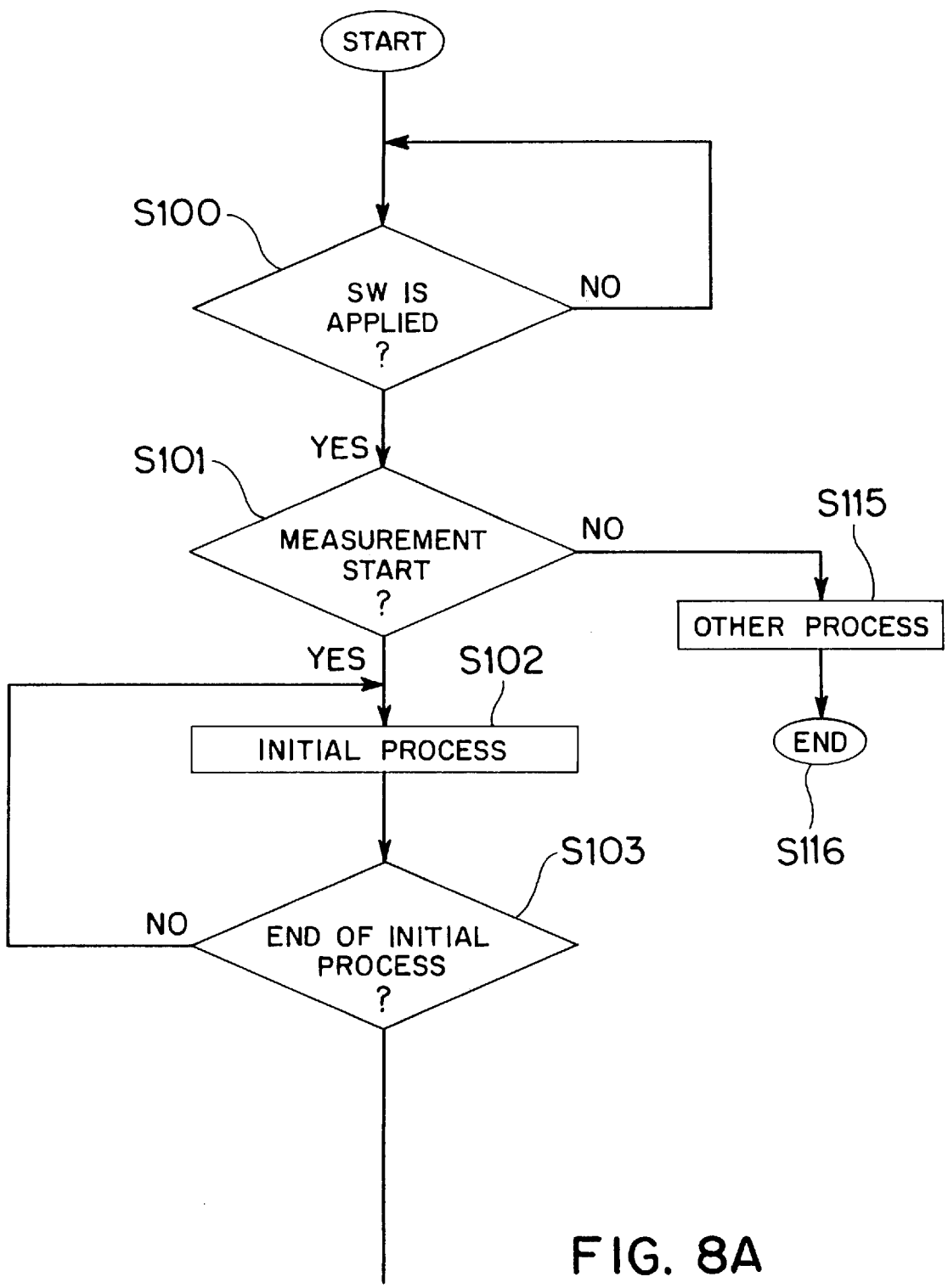
FIG. 8 is a flowchart illustrating a series of operations performed by a portable GPS receiver in accordance with the invention.
Figure 8B:
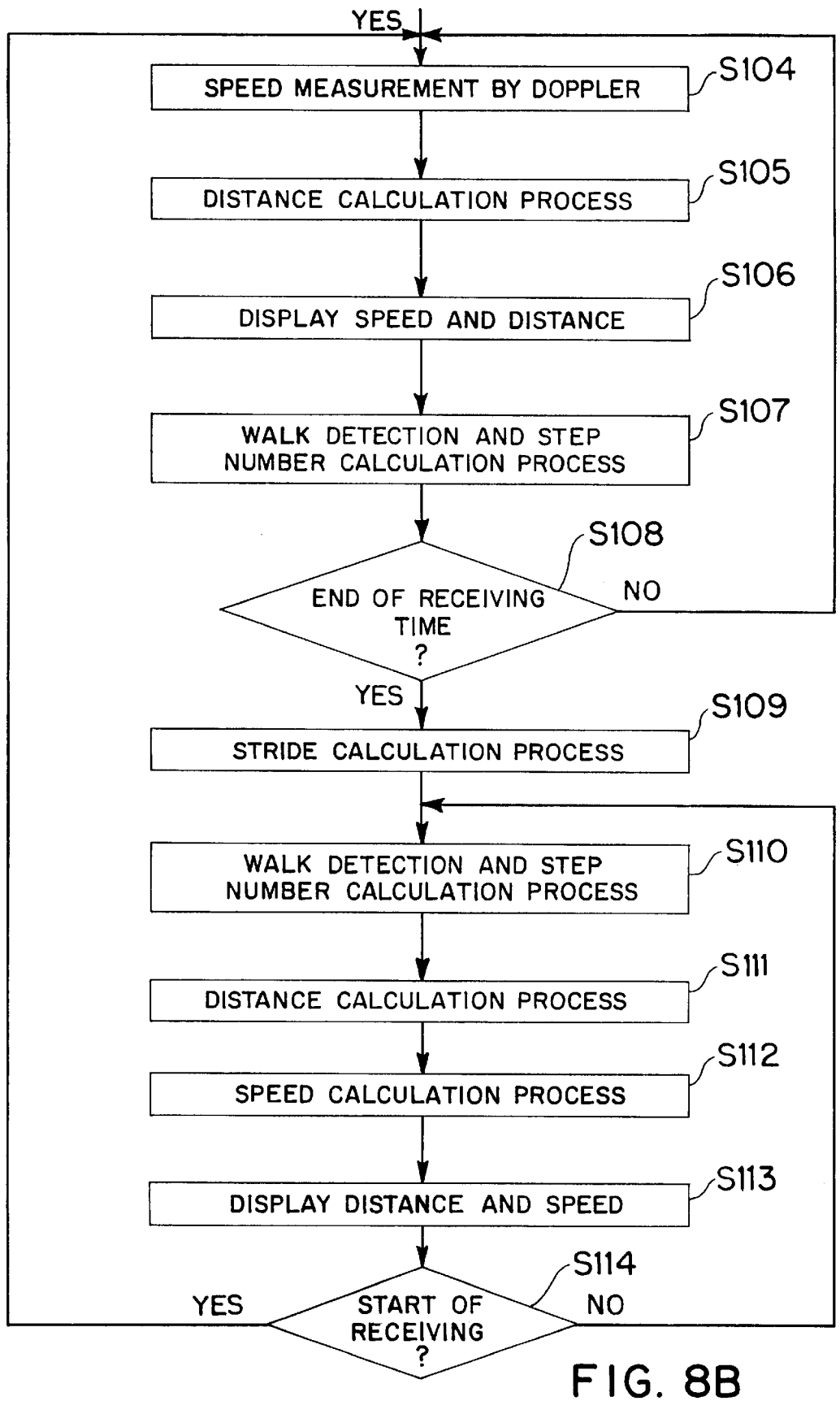

FIG. 8 is a flowchart illustrating the operation of a portable GPS receiver shown in FIG. 7. The CPU waits until an input signal for commanding start of measurement of the distance or speed is applied from the input circuit 708. A decision is made as to whether a signal SW is applied (step 100). If the result is YES, a decision is made as to whether it is a measurement-starting signal (step 101). If the result is YES, the measurement is started. If it is any other input signal, other processing is performed (step 115). If it is a measurement start signal, the GPS receiver captures a given number of satellites, and initial processing is performed until required data is fully collected (step 102). A decision is made as to whether the initial processing has been completed (step 103). If the initial processing is complete, processing for measuring the speed by making use of the Doppler frequencies of the carrier waves is started (step 104). The distance is calculated from the measured speed and from the time (step 105). The speed and distance are displayed (step 106). Simultaneously with the measurement of the speed relying on the measurement of the Doppler frequencies of the carrier waves, the walk-detecting means 100 detects walking and accumulates the number of steps taken in walking (step 107). A decision is made as to whether a predetermined time has passed (step 108). If the result of the decision is NO, the reception is continued. After a lapse of a given time, the reception is ended, and the stride, or the distance per step, is calculated (step 109).

Figure 9:
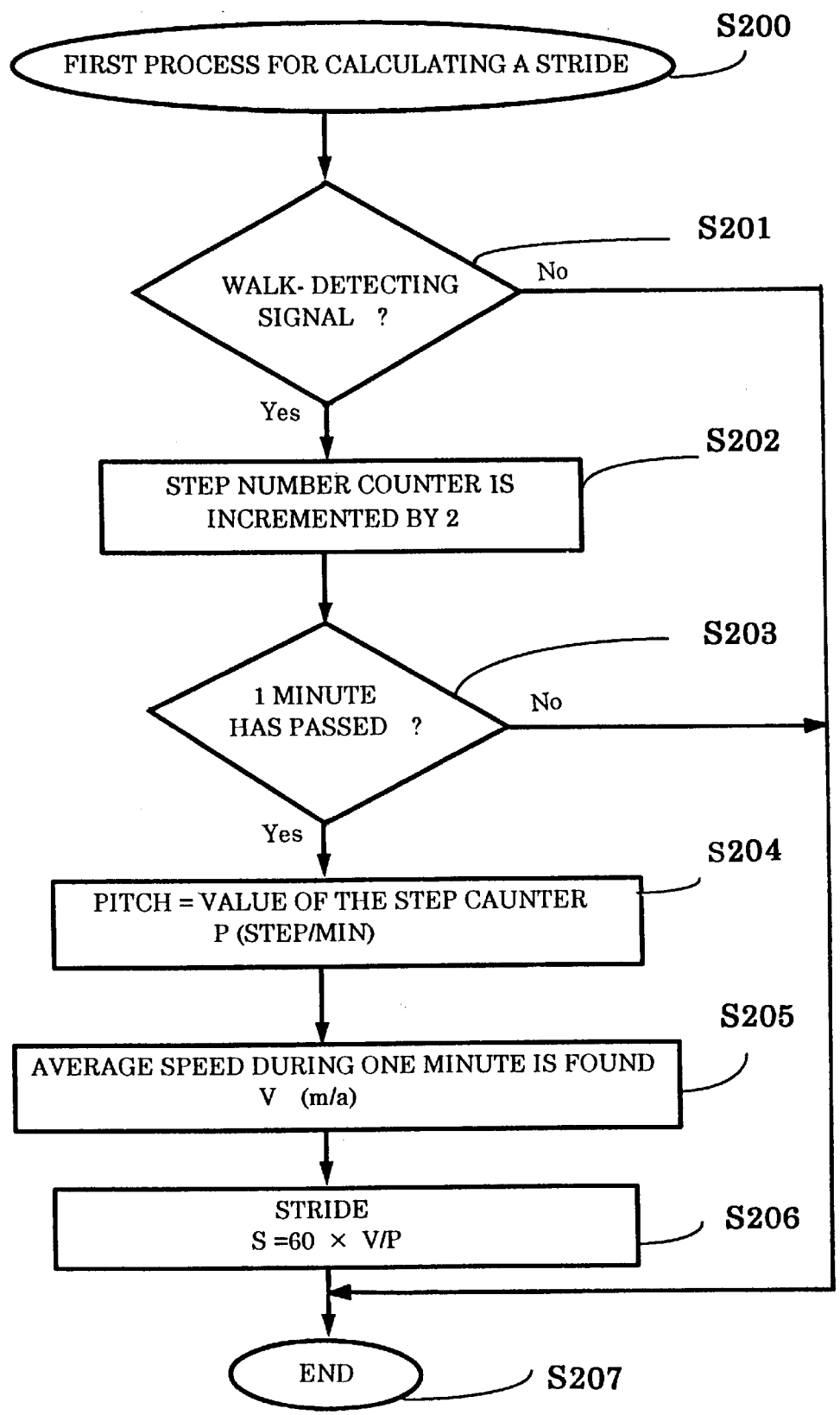
FIG. 9 is a flowchart illustrating first processing for calculating a stride by a portable GPS receiver in accordance with the invention.
Figure 10:
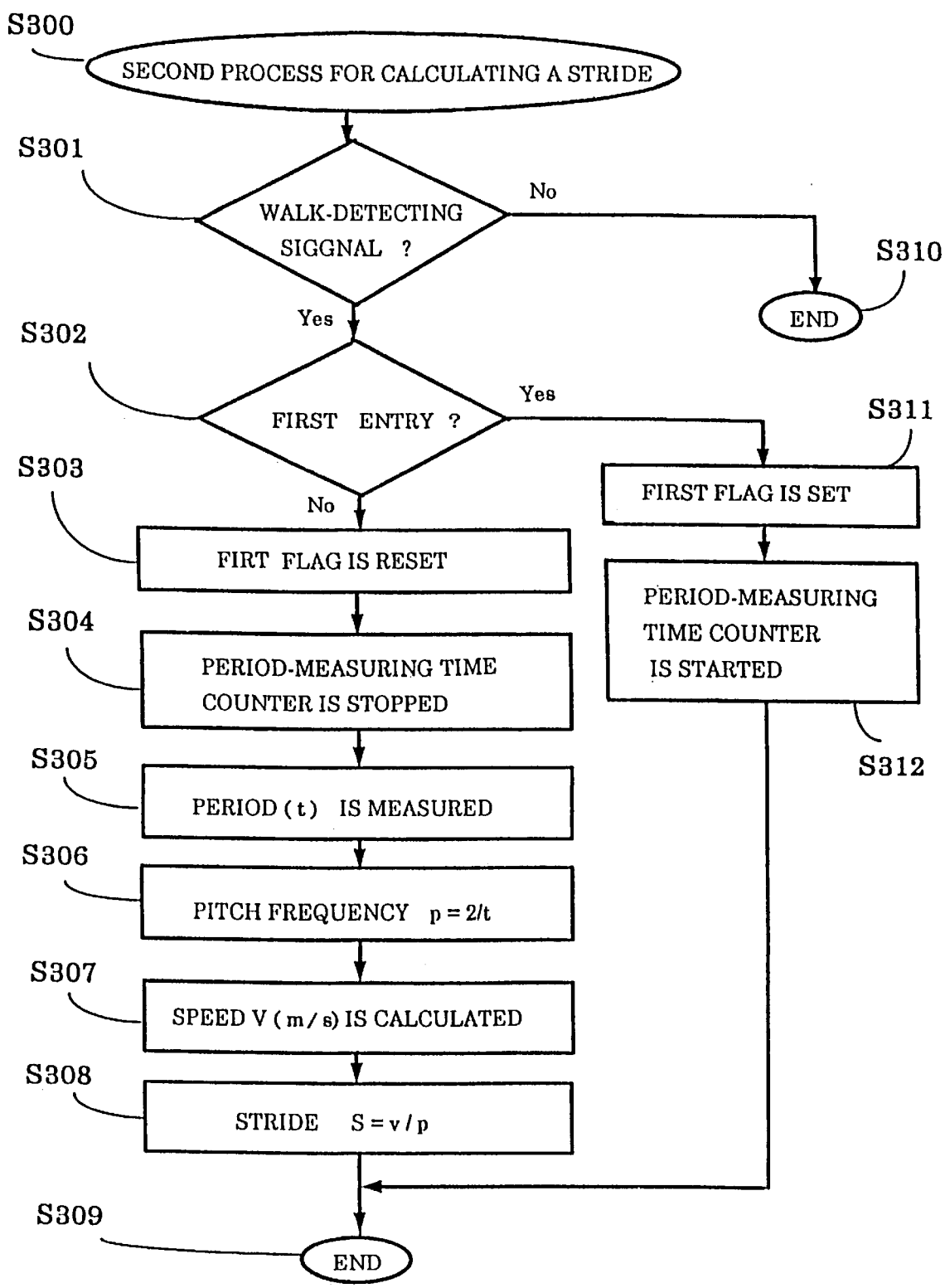
FIG. 10 is a flowchart illustrating second processing for calculating a stride by a portable GPS receiver in accordance with the invention.

FIGS. 9 and 10 are flowcharts illustrating the arithmetic operations for calculating the stride. In FIG. 9, first processing for calculating the stride is started (step 200)) A decision is made as to whether a walk-detecting signal is entered (step 201). If the result of the decision is YES, a step number counter 2 is incremented by 2, because two steps are taken during one period of the swinging arm (step 202). Then, a decision is made as to whether 1 minute has passed (step 203). If the result of the decision is YES, the present value of the step counter, or the number of steps per minute, is taken as the pitch (steps/min) (step 204). The average speed V (m/sec) during this one minute is found (step 205). Thereafter, the stride is found (step 206).

FIG. 10 is a flowchart illustrating second processing for calculating the stride. The second processing for calculating the stride is started (step 300). A decision is made as to whether a walk-detecting signal is entered (step 301). If the result of the decision is YES, a decision is made according to a first flag as to whether it is the first entry (step 302). If so, the first flag is set so that the next entry is the second entry (step 311). Then, a period-measuring time counter is started (step 312). If the walk-detecting signal is the second entry, the first flag is reset so that the next entry will be the first entry (step 303). Then, the period-measuring time counter is stopped (step 304). The period is measured and found to be t (step 305). Since this period t is the period of the swinging movement of the arm, the period t is divided by 2 to convert the period into the pitch per second. That is, the pitch in frequencies is given by $p=2/t$ (step 306). In this example, the frequency of the walk-detecting signal is found by measuring the time. Alternatively, the frequency may be found by frequency analysis. Then, the speed v (m/sec) is found (step 307). The stride $S=v/p$ is found (step 308). The stride is once found during the reception of the GPS receiver by the method described thus far. Subsequently, walking is detected and the number of steps is accumulated, irrespective of the reception operation of the GPS receiver (step 110). The distance is calculated from the number of steps and from the stride (step 111). The speed is found from both calculated distance and time (step 112). The distance and speed are displayed (step 113). A decision is made as to whether a certain reception-starting condition holds during halt of the reception operation of the GPS receiver 600 (step 114). If the result of the decision is YES, the GPS receiver 600 measures the speed and a new stride is found.

As a first example of the reception-starting condition, the time-measuring-and-timing signal-generating means 107 operates a timer clock that generates a timeout signal after a fixed period of time. The speed is calculated from the detected number of steps and from the stride until the fixed period elapses. Then, the reception is started.

As a second example, the pitch, or the number of steps per unit time, is computed from the number of steps found by the step number-calculating means 102 and from the time measured by the time-measuring-and-timing signal-generating means 107. If the difference between the presently calculated pitch and the previous pitch is greater than a certain value, then there is a possibility of occurrence of a change in the stride. Therefore, the reception is started. As a third example, the walking magnitude-detecting means 300 detects changes in the magnitude of the walking. If a certain change takes place, the reception is started.

Figure 11:
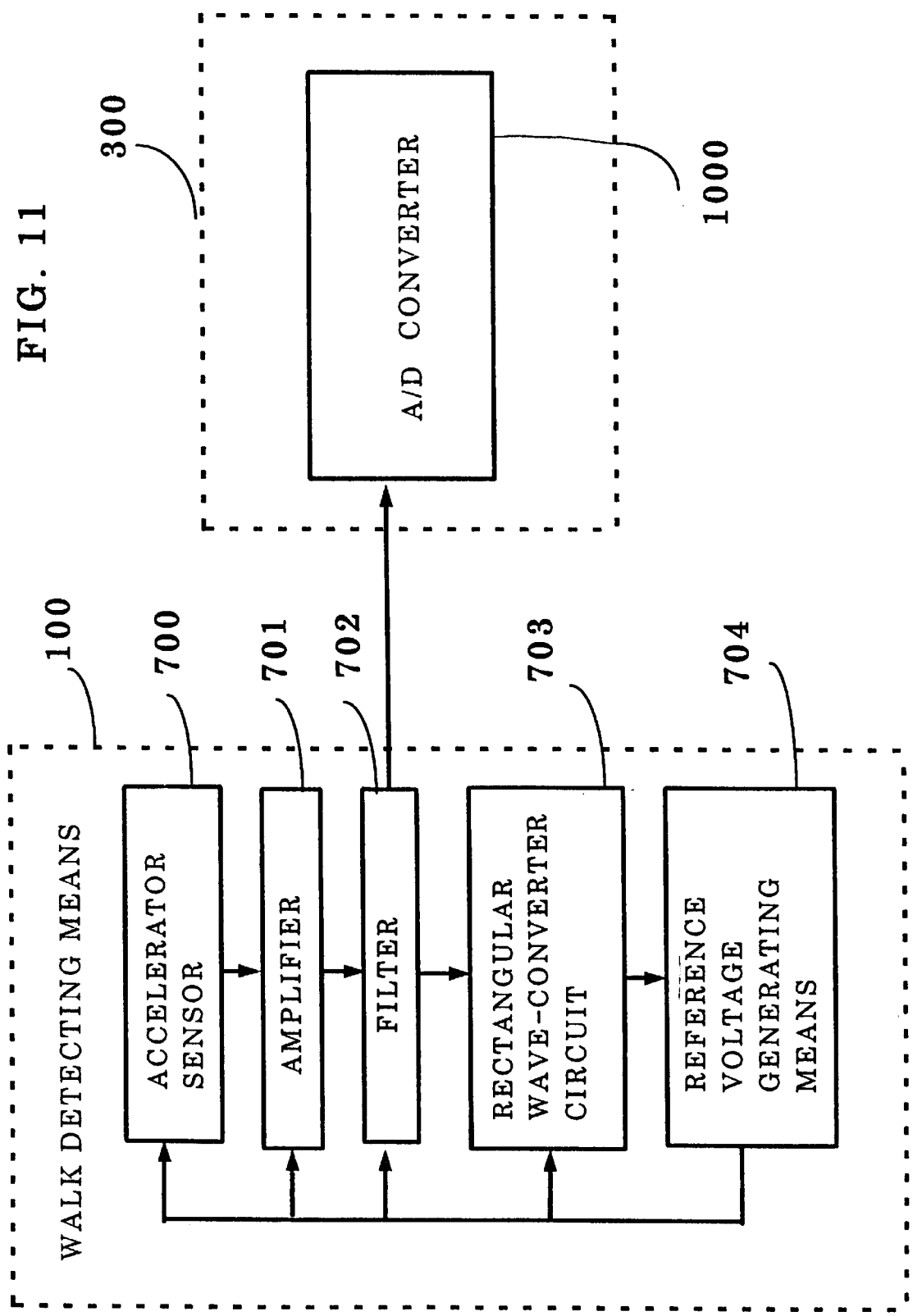
FIG. 11 is a block diagram of a specific example of a walking magnitude-detecting means incorporated in a portable GPS receiver in accordance with the invention.

FIG. 11 shows a specific example of the walking magnitude-detecting means 300. The accelerator sensor 700 of the walk-detecting means 100 uses a cantilevered accelerator sensor to which a piezoelectric device is bonded. This accelerator sensor 700 generates vibrating displacements according to walking or running and produces a corresponding electric charge. The amplifier circuit 701 amplifies the output signal from the accelerator sensor 700. The filter 702 filters out noise components such as ac line-frequency components. The rectangular wave-converter circuit 703 converts the output signal from the filter 702 into digital form. The reference voltage-generating circuit 704 applies a reference voltage to the various circuits of the walk-detecting means 100.

Figure 12:
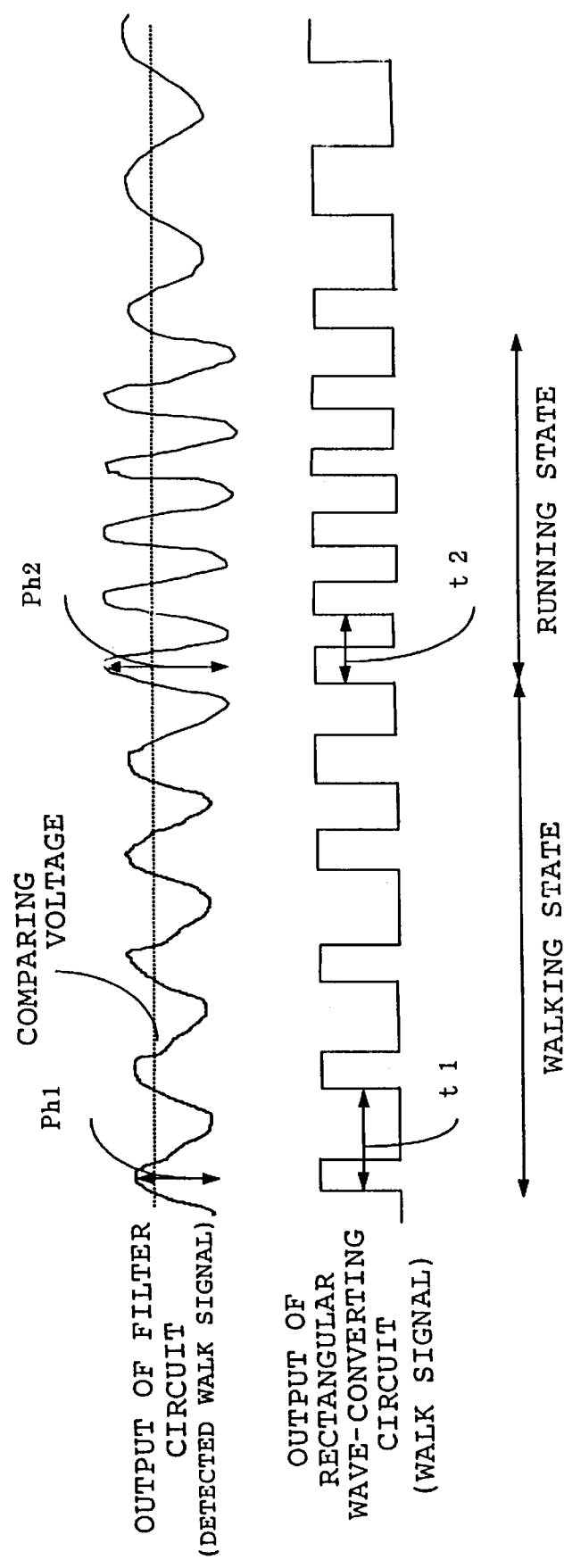
FIG. 12 is a waveform diagram illustrating a walk signal from a walking magnitude-detecting means incorporated in a portable GPS receiver in accordance with the invention and the output signal from a rectangular wave-converting circuit.

FIG. 12 is a waveform diagram showing the detected walk signal and the output from the rectangular wave converter circuit. The period t and the peak height ph of the walk-detecting signal differ, according to the magnitude of the walk. The period t is found from the converted rectangular wave. If the user makes a transition from a walking state to a running state, the peak height changes from Ph1 to Ph2, and the period varies from t1 to t2. This change in the peak height is detected by an A/D converter 1100 shown in FIG. 11. If the rate of change of the magnitude of the detected walk signal reaches a certain value, there is a possibility that the stride has changed. Therefore, the reception is started. As a fourth example, changes in the illuminance around the instrument are detected by the illuminance change-detecting means 400. If a certain change in the illuminance occurs as encountered when the receiver comes out of a tunnel, the reception is commenced.

Figure 13:
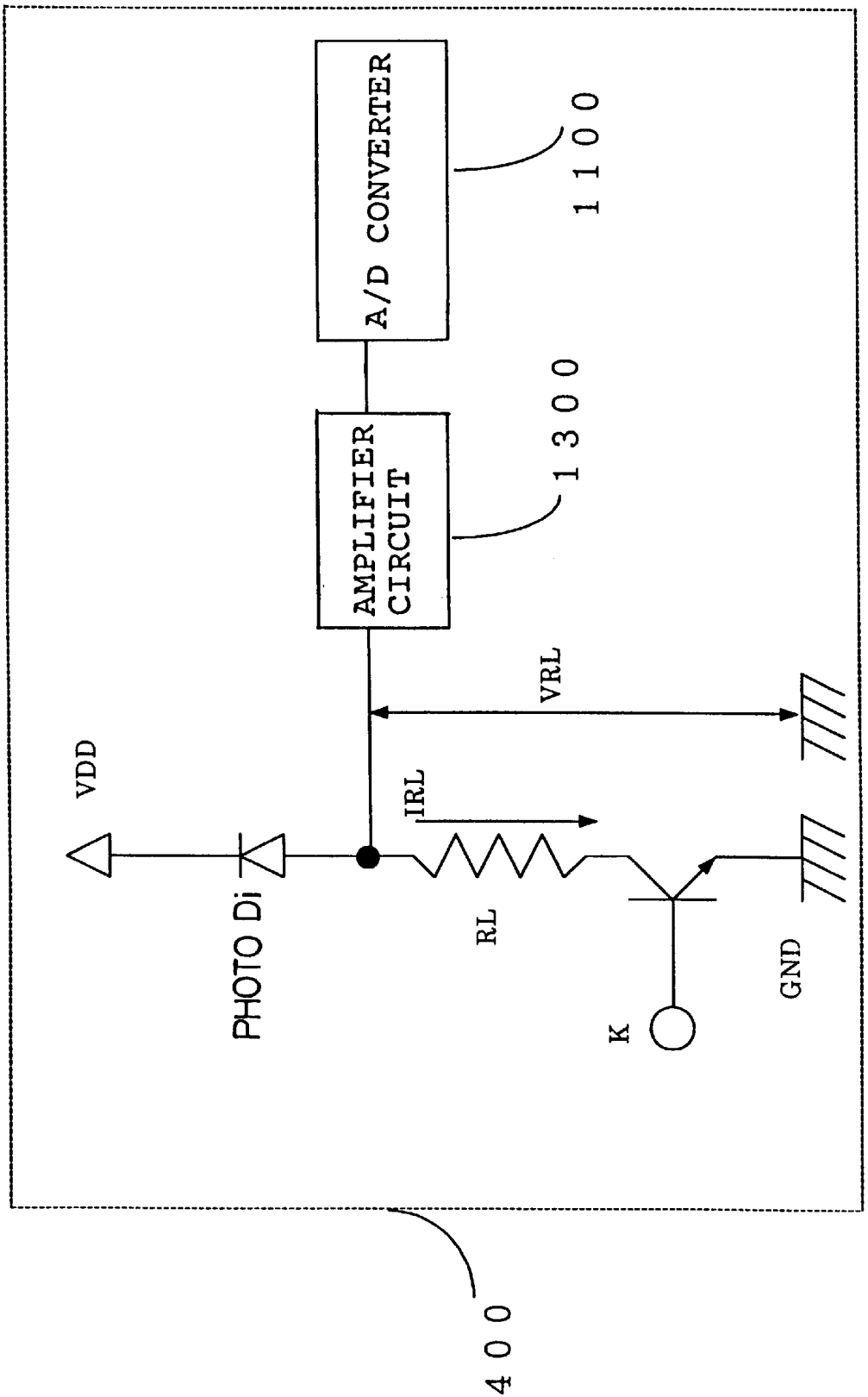
FIG. 13 is CL circuit diagram of an illuminance change-detecting means incorporated in a portable GPS receiver in accordance with the invention.

FIG. 13 shows a specific example of the illuminance change-detecting means 400. in response to a detection-starting signal K, the detecting means 400 starts detection. If extraneous light falls on a photodiode Di, a current IRL flowing across a load resistor RL changes in proportion to the amount of the light impinging on the extraneous light. This change in the current IRL is taken as a change in VRL and amplified by an amplifier 1300. The output signal from this amplifier 1300 is convert ed into digital form by the A/D converter 1300, thus detecting the change in the illuminance of the extraneous light. If the rate of change of the detected illuminance of the extraneous light reaches a given value, the reception is started. As a fifth example, the pulse rate-detecting means 500 detects the pulse rate of the user. If a certain change in the pulse rate occurs due to a change in the magnitude of the exercise, the reception is started.

Figure 14:
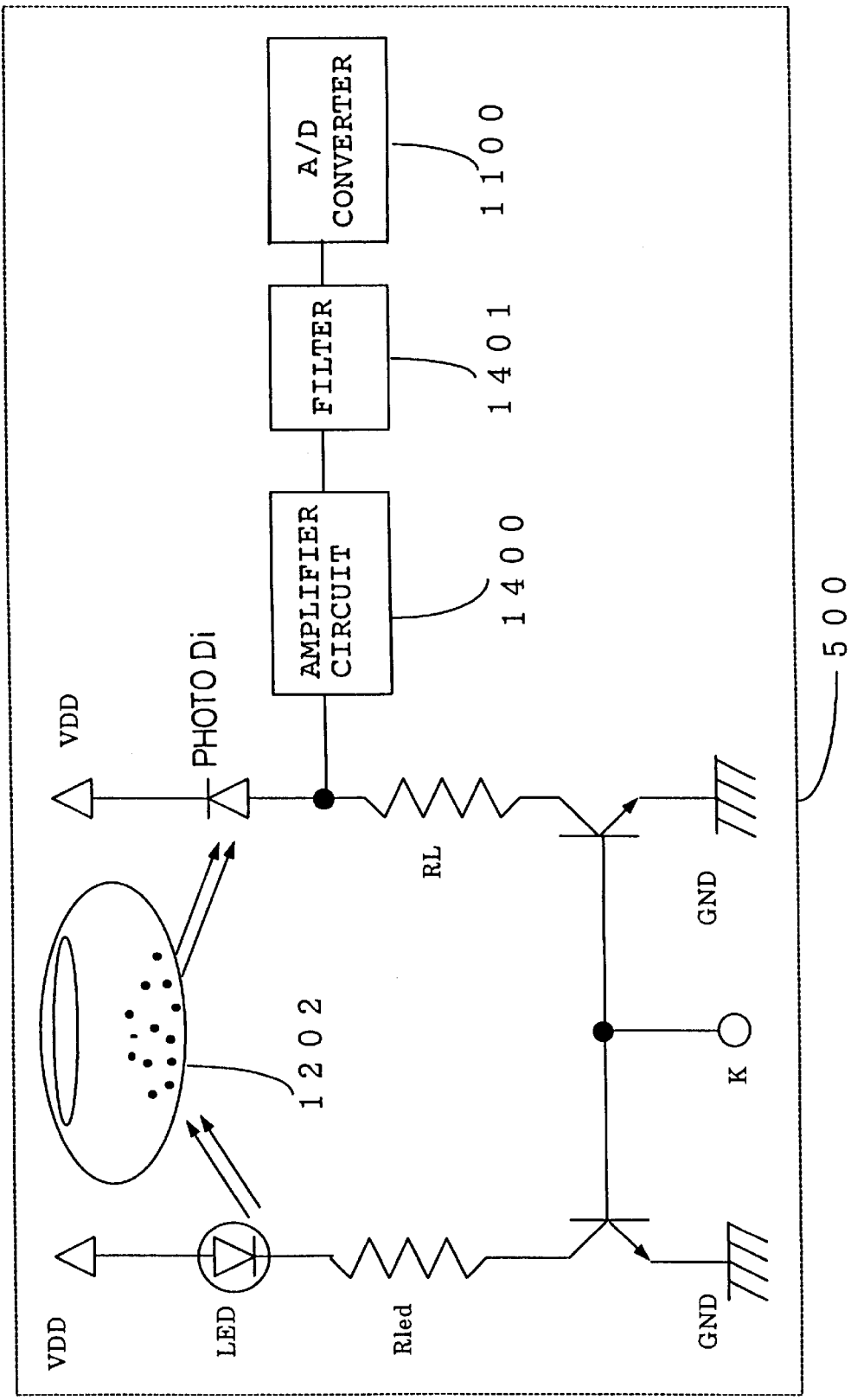
FIG. 14 is a circuit diagram of a pulse rate-detecting means incorporated in a portable GPS receiver in accordance with the invention.

FIG. 14 shows a specific example of the pulse rate-detecting means 500. In response to a detection-starting signal K, the detecting means 500 starts detection. An LED directs light to a finger 1202, and the reflected light enters a photodiode Di. The incident light contains information about the pulse rate. The output signal from the photodiode Di is amplified by an amplifier circuit 1400. A filter circuit 1401 is connected with the output of the amplifier circuit 1400 to filter out noises, thereby enhancing the signal-to-noise ratio. The output signal from the filter circuit 1401 is converted into digital form by an A/D converter 1100. The digital data from the converter 1103 is input to the CPU 101 and converted into a pulse rate. If the rate of change of the pulse rate reaches a given value, there is the possibility that the magnitude of the exercise has changed and the stride has varied. Therefore, the reception is started. In this way, the stride is updated under some reception-starting conditions. The stride is found more accurately and used to calculate the distance traveled and the speed.

As described thus far, in the present invention, the GPS receiver once finds the speed from the Doppler frequencies of the carrier waves. The distance is found from the speed. The number of steps taken in walking is accumulated. The stride is found from both distance and accumulated number of steps. Then, the distance traveled and the speed are found from the stride and from the accumulated step number. This permits continuous measurements at locations where such measurements would normally be difficult to perform, such as in a tunnel and in a valley between tall buildings. Furthermore, the GPS receiver is not required to perform measurements continuously, because the distance and speed are found from the stride. In consequence, power consumption curtailment can be accomplished.

What is claimed is:

1. A portable GPS receiver carried by a person who is in a location and walks or runs a distance at a speed, said GPS receiver being adapted to receive GPS signals from GPS satellites, said GPS signals containing carrier waves having Doppler frequencies, said GPS receiver acting to measure the location of said GPS receiver and the Doppler frequencies of the carrier waves and to determine the speed from said Doppler frequencies, said GPS receiver comprising:

a walk-detecting means for detecting walking or running of the person and producing a walk signal indicative of the walking;

a step number-calculating means for receiving said walk signal, calculating number of steps taken in walking, and producing a step number signal indicative of said number of steps;

a time-measuring-and-timing signal-generating means for measuring time and generating both a time signal and a reference timing signal;

a first distance-calculating means for receiving a signal indicating said determined speed, said time signal, and said reference timing signal, calculating the distance from said speed, and producing a first distance signal indicative of said calculated distance;

a stride-calculating means for receiving said first distance signal and said step number signal, calculating a stride per step, and producing a stride signal indicative of said calculated stride;

a second distance-calculating means for receiving said step number signal and said stride signal, calculating a distance traveled by said person, and producing a second distance signal indicative of said calculated distance;

a speed-calculating means for receiving said second distance signal, said time signal, and said reference timing signal, calculating the speed of said person, and producing a speed signal indicative of said calculated speed;

a display means for receiving said second distance signal, said speed signal, said timing signal and displaying said second distance, said speed, and said time; and a reception operation control means for receiving said time signal and said timing signal and acting to start reception operation of said GPS receiver at regular intervals of time and to end said reception operation after a lapse of a given time.

2. A portable GPS receiver carried by a person who is in a location and walks or runs a distance at a speed, said GPS receiver being adapted to receive GPS signals from GPS satellites, said GPS signals containing carrier waves having Doppler frequencies, said GPS receiver acting to measure the location of said GPS receiver and the Doppler frequencies of the carrier waves and to determine the speed from said Doppler frequencies, said GPS receiver comprising:

a walk-detecting means for detecting walking or running of the person and producing a walk signal indicative of the walking;

a step number-calculating means for receiving said walk signal, calculating number of steps taken in walking, and producing a step number signal indicative of said number of steps;

a time-measuring-and-timing signal-generating means for measuring time and generating both a time signal and a reference timing signal;

a first distance-calculating means for receiving a signal indicating said determined speed, said time signal, and said reference timing signal, calculating the distance from said speed, and producing a first distance signal indicative of said calculated distance;

a stride-calculating means for receiving said first distance signal and said step number signal, calculating a stride per step, and producing a stride signal indicative of said calculated stride;

a second distance-calculating means for receiving said step number signal and said stride signal, calculating a distance traveled by said person, and producing a second distance signal indicative of said calculated distance;

a speed-calculating means for receiving said second distance signal, said time signal, and said reference timing signal, calculating the speed of said person, and producing a speed signal indicative of said calculated speed;

a display means for receiving said second distance signal, said speed signal, said timing signal and displaying said second distance, said speed, and said time;

a pitch-calculating means for receiving said step number signal, said time signal, and said timing signal, calculating a pitch given by the number of steps per unit time, and producing a pitch signal indicative of said calculated pitch; and a reception operation control means for receiving said time signal, said timing signal, and said pitch signal and acting to start reception operation of said GPS receiver in response to a certain change in the pitch signal and to end said reception operation after a lapse of a given time.

3. A portable GPS receiver carried by a person who is in a location and walks or runs a distance at a speed, said GPS receiver being adapted to receive GPS signals from GPS satellites, said GPS signals containing carrier waves having Doppler frequencies, said GPS receiver acting to measure the location of said GPS receiver and the Doppler frequencies of the carrier waves and to determine the speed from said Doppler frequencies, said GPS receiver comprising:

a walk-detecting means for detecting walking or running of the person and producing a walk signal indicative of the walking;

a step number-calculating means for receiving said walk signal, calculating number of steps taken in walking, and producing a step number signal indicative of said number of steps;

a time-measuring-and-timing signal-generating means for measuring time and generating both a time signal and a reference timing signal;

a first distance-calculating means for receiving a signal indicating said determined speed, said time signal, and said reference timing signal, calculating the distance from said speed, and producing a first distance signal indicative of said calculated distance;

a stride-calculating means for receiving said first distance signal and said step number signal, calculating a stride per step, and producing a stride signal indicative of said calculated stride;

a second distance-calculating means for receiving said step number signal and said stride signal, calculating a distance traveled by said person, and producing a second distance signal indicative of said calculated distance;

a speed-calculating means for receiving said second distance signal, said time signal, and said reference timing signal, calculating the speed of said person, and producing a speed signal indicative of said calculated speed;

a display means for receiving said second distance signal, said speed signal, said timing signal and displaying said second distance, said speed, and said time;

a walking magnitude-detecting means for judging amplitude of said walk signal from said walking-detecting means, detecting magnitude of the walk, and producing a walking magnitude signal indicative of said magnitude of the walk; and a reception operation control means for receiving said time signal, said timing signal, and said walking magnitude signal and acting to start reception operation of said GPS receiver in response to certain changes in the magnitude of said walk signal and to end said reception operation after a lapse of a given time.

4. A portable GPS receiver carried by a person who is in a location and walks or runs a distance at a speed, said GPS receiver being adapted to receive GPS signals from GPS satellites, said GPS signals containing carrier waves having Doppler frequencies, said GPS receiver acting to measure the location of said GPS receiver and the Doppler frequencies of the carrier waves and to determine the speed from said Doppler frequencies, said GPS receiver comprising:

a walk-detecting means for detecting walking or running of the person and producing a walk signal indicative of the walking;

a step number-calculating means for receiving said walk signal, calculating number of steps taken in walking, and producing a step number signal indicative of said number of steps;

a time-measuring-and-timing signal-generating means for measuring time and generating both a time signal and a reference timing signal;

a first distance-calculating means for receiving a signal indicating said determined speed, said time signal, and said reference timing signal, calculating the distance from said speed, and producing a first distance signal indicative of said calculated distance;

a stride-calculating means for receiving said first distance signal and said step number signal, calculating a stride per step, and producing a stride signal indicative of said calculated stride;

a second distance-calculating means for receiving said step number signal and said stride signal, calculating a distance traveled by said person, and producing a second distance signal indicative of said calculated distance;

a speed-calculating means for receiving said second distance signal, said time signal, and said reference timing signal, calculating the speed of said person, and producing a speed signal indicative of said calculated speed;

a display means for receiving said second distance signal, said speed signal, said timing signal and displaying said second distance, said speed, and said time;

an illuminance change-detecting means for detecting changes in illuminance around said GPS receiver and producing an illuminance change signal indicative of said changes in the illuminance; and a reception operation control means for receiving said time signal, said timing signal, and said illuminance change signal and acting to start reception operation of said GPS receiver in response to certain changes in the illuminance and to end said reception operation after a lapse of a given time.

5. A portable GPS receiver carried by a person who is in a location and walks or runs a distance at a speed, said GPS receiver being adapted to receive GPS signals from GPS satellites, said GPS signals containing carrier waves having Doppler frequencies, said GPS receiver acting to measure the location of said GPS receiver and the Doppler frequencies of the carrier waves and to determine the speed from said Doppler frequencies, said GPS receiver comprising:

a walk-detecting means for detecting walking or running of the person and producing a walk signal indicative of the walking;

a step number-calculating means for receiving said walk signal, calculating number of steps taken in walking, and producing a step number signal indicative of said number of steps;

a time-measuring-and-timing signal-generating means for measuring time and generating both a time signal and a reference timing signal;

a first distance-calculating means for receiving a signal indicating said determined speed, said time signal, and said reference timing signal, calculating the distance from said speed, and producing a first distance signal indicative of said calculated distance;

a stride-calculating means for receiving said first distance signal and said step number signal, calculating a stride per step, and producing a stride signal indicative of said calculated stride;

a second distance-calculating means for receiving said step number signal and said stride signal, calculating a distance traveled by said person, and producing a second distance signal indicative of said calculated distance;

a speed-calculating means for receiving said second distance signal, said time signal, and said reference timing signal, calculating the speed of said person, and producing a speed signal indicative of said calculated speed;

a display means for receiving said second distance signal, said speed signal, said timing signal and displaying said second distance, said speed, and said time;

a pulse rate-detecting means for detecting pulse rate of said person carrying said GPS receiver and producing a pulse rate signal indicative of said pulse rate synchronized with pulsation of the heart of the person; and a reception operation control means for receiving said time signal, said timing signal, and said pulse rate signal and acting to start reception operation of said GPS receiver in response to certain changes in the pulse rate signal and to end said reception operation after a lapse of a given time.

* * * * *